United States Patent [19]

Bryant et al.

[11] Patent Number: 4,686,275

[45] Date of Patent: Aug. 11, 1987

[54] SATURATED LINEAR POLYESTER RESIN COMPOSITION SUITABLE FOR COATING A METAL FOR ANTI-CORROSION AND/OR DECORATIVE PURPOSES

[75] Inventors: Collin J. Bryant, Weston; Tom Mitsopoulos, Toronto, both of Canada

[73] Assignee: Valvoline Oil & Chemicals Ltd., Mississauga, Canada

[21] Appl. No.: 832,610

[22] Filed: Feb. 25, 1986

[51] Int. Cl.$^4$ ............................................. C08G 63/48
[52] U.S. Cl. .................... 528/295.5; 525/425; 525/443
[58] Field of Search .................... 525/425, 443; 528/295.5

[56] References Cited

U.S. PATENT DOCUMENTS

| | | | |
|---|---|---|---|
| 3,714,091 | 1/1973 | Lasher | 528/295.5 X |
| 4,482,701 | 11/1984 | Yamamori et al. | 528/295.5 |
| 4,535,132 | 8/1985 | Ambrose et al. | 525/443 |
| 4,540,751 | 9/1985 | Lynch et al. | 528/295.5 X |

Primary Examiner—Lucille M. Phynes
Attorney, Agent, or Firm—Robert P. Delbridge; Arne I. Fors

[57] ABSTRACT

A saturated linear polyester resin composition suitable for coating a metal for anti-corrosion and/or decorative purposes contains a polyol, a dibasic acid and from about 4 to about 12% by weight solids of a $C_{16}$ to $C_{18}$ carbon chain oil function in the form of a fatty acid or derivative thereof.

16 Claims, No Drawings

SATURATED LINEAR POLYESTER RESIN COMPOSITION SUITABLE FOR COATING A METAL FOR ANTI-CORROSION AND/OR DECORATIVE PURPOSES

This invention relates to polyester resin compositions which are used for coating metal for anti-corrosion and/or decorative purposes.

It is customary to coat sheet metal, such as aluminum or steel sheet, with a polyester resin composition to improve its corrosion resistance and/or to provide an asthetic appearance. A liquid polyester resin composition is usually sprayed onto a metal sheet as it is unwound from a coil and travels passed a spray station, with the coating thickness being controlled for example by a doctor blade. The liquid resin coating is then subsequently cured by heat with simultaneous evaporation of solvent to form a solid coating, for example by passing the coated metal sheet through a curing station where the coating encounters a temperature of about 500° F. (260° C.) for about 30 seconds. The resultant solid coating typically has a thickness of from about 0.8 to about 1.5 mil. The coated sheet metal is then usually re-coiled for storage and transportation.

The resin coating should be non-sticky and should also be sufficiently ductile so as to be capable of accommodating subsequent shaping or forming of the metal without cracking of the coating. For example, coated aluminum sheet may subsequently be used to produce eaves troughing or siding for houses or other buildings. The coatings are usually opaque and may be white or any other desired colour.

A problem with known polyester resin coatings for this purpose is that of dirt pick-up, that is to say coated metal products such as eaves troughing and siding pick-up dirt from the atmosphere over a period of time and hence become unattractive in appearance.

It is therefore an object of the invention to provide an improved resin coating for the purpose described which is more resistant to dirt pick-up than known coatings of this kind.

A typical known coating is formed by using a saturated linear polyester resin which is substantially oil-free and which comprises a polyol (dibasic alcohol) and a dibasic acid, the resin being dissolved in a solvent. The polyol may be propylene glycol, and the dibasic acid may be isopthalic acid, pthalic acid, adipic acid or mixtures thereof. The liquid polymer (polyester resin in solvent) is cured with a liquid amino resin to cause further polymerization and cross-linking of the hydroxyl and/or carboxyl functions with resultant formation of a solid coating. The amino resin may comprise melamine-formaldehyde or urea formaldehyde resins.

In its liquid form, the polyester resin composition preferably has a relatively high solids content, for example from about 60 to about 90% by weight solids, or preferably from about 75 to about 90% by weight solids.

The present invention is based on the surprising discovery that a satisfactory coating which has improved resistance to dirt pick-up can be produced by incorporating from about 4 to about 12% by weight solids of an oil fraction comprising $C_{16}$ to $C_{18}$ carbon chains in a polyester resin composition of the kind described above. Such a coating can be more easily cleaned than previously known coatings. The oil fraction preferably comprises a $C_{16}$ to $C_{18}$ fatty acid or derivative thereof, such as a triglyceride of a fatty acid. It is surprising both that such an amount of an oil fraction produces improved resistance to dirt pick-up and also that such an amount of an oil fraction does not promote an undue amount of chalking. Although conventional alkyd coating resin (paint) formulations frequently include higher percentages (from about 25 to 70% by weight solids) of $C_{16}$ to $C_{18}$ carbon chain oil compounds to modify flexibility, solubility, gloss, viscosity and surface characteristics of the resultant polymer, it is completely unexpected that the incorporation of from about 4 to about 12% of an oil fraction in a composition of the kind concerned would reduce dirt pick-up without promoting an undue amount of chalking. Chalking is the term applied to deterioration of the surface of the coating after exposure to the atmosphere. With previously known coatings of the kind concerned, chalking may occur after about a year of exposure. The deterioration of the surface of the coating is such that the coating surface can be washed away.

A further major advantage of the invention is that such an oil fraction can be added to a resin coating composition of the known kind described above without adversely affecting the desired properties. For example, the saturated nature and linearity of the polyester polymer can be retained, the curing properties are not unduly changed, the coating formed is not unduly softened and is still adequately ductile. Further, gloss, weatherability and colour retention are also not unduly affected by incorporation of an oil fraction in accordance with the present invention.

Although the reason for the success of the invention is not clearly understood, according to one theory it may be that the oil double bonds are conjugated on the surface of the coating, and oxidation and cross linking occurs to keep the coating surface hard and more resistant to dirt pick-up.

The oil fraction of the present invention may for example be dehydrated caster oil, dehydrated castor fatty acid, coconut fatty acid, hydrogenated caster oil, coconut oil or mixture thereof.

Typical compositions in accordance with the present invention are shown in the following examples.

|  | Parts by weight % |
|---|---|
| Examples A to E | |
| Propylene glycol | 34.7 |
| Isopthalic acid | 19.0 |
| Pthalic anhydride | 19.0 |
| Adipic acid | 19.9 |
| (1) Dehydrated castor fatty acid | |
| (2) Coconut fatty acid | |
| (3) Tall oil fatty acid | 7.4 |
| (4) Dimer acid | |
| (5) Hydrogenated castor oil | |
| Example F | |
| Propylene glycol | 33.0 |
| Isopthalic acid | 39.0 |
| Adipic acid | 20.5 |
| Dehydrated castor oil | 7.5 |
| Example G | |
| Propylene glycol | 33.5 |
| Isopthalic acid | 18.3 |
| Pthalic acid | 18.3 |
| Adipic acid | 19.2 |
| Dehydrated castor oil | 10.7 |
| Example H | |
| Neo pentyl glycol | 41.7 |
| Isopthalic acid | 16.7 |
| Pthalic anhydride | 16.7 |
| Adipic acid | 17.5 |

-continued

| | Parts by weight % |
|---|---|
| Dehydrated castor oil | 7.4 |

In Examples A to E, the first four components represent a known resin composition sold under the trade mark AROPLAZ, the specific composition shown being known as AROPLAZ 3256.

Tests were carried out with four production batches of AROPLAZ 3256 compositions and with the compositions of Examples F and G in accordance with the invention. Each composition was applied in known manner both to an aluminum panel and to a Bonderite test panel. A Bonderite test panel is a steel panel with a Bonderite corrosion-inhibiting finish, Bonderite being a trademark of Parker Chemical Company of Detroit, Mich., United States of America. Thus, Test 1a concerns a coating from the first production batch applied to aluminum, and Test 1b concerns a coating from the first production batch applied to a Bonderite coating. Similarity, Tests 2a, 2b, 3a, 3b, 4a and 4b concerned coatings from the second to fourth production batches. Tests 5a and 5b concerned coatings in accordance with Example F, and Tests 6a and 6b concerned coatings in accordance with Example G. In each test, the coatings were applied in accordance with conventional practice, the solid coating thickness (dry film thickness) being 1.5 to 2.0 mil.

The panels were exposed to the atmosphere in the State of Florida, United States of America, for twelve months. In North America, eaves troughing and siding are conventionally tested in Florida, where the warm, humid and salt-containing atmosphere severely tests such products. Both the 60 degree and 20 degree gloss was measured initially, in a conventional manner, and the 60 degree gloss was measured after three, six, nine and twelve months. The panels were then cleaned as well as possible, and the 60 degree gloss re-measured.

The test results are shown in Table 1.

TABLE 1

| Test | Initial 60°/20° gloss | Florida 60° Gloss Uncleaned | | | | 12 Month 60° gloss Cleaned |
|---|---|---|---|---|---|---|
| | | 3 Month | 6 Month | 9 Month | 12 Month | |
| PRIOR ART | | | | | | |
| 1a | 95/93 | 77 | 64 | 58 | 55 | 83 |
| 1b | 91/89 | 77 | 65 | 59 | 56 | 89 |
| 2a | 95/93 | 77 | 63 | 58 | 57 | 86 |
| 2b | 93/92 | 77 | 66 | 61 | 58 | 87 |
| 3a | 95/82 | 77 | 56 | 44 | 38 | 55 |
| 3b | 92/83 | 76 | 60 | 54 | 44 | 64 |
| 4a | 95/86 | 75 | 59 | 52 | 52 | 75 |
| 4b | 93/90 | 76 | 61 | 56 | 56 | 79 |
| INVENTION | | | | | | |
| 5a | 97/93 | 79 | 71 | 66 | 66 | 88 |
| 5b | 96/92 | 79 | 69 | 65 | 63 | 87 |
| 6a | 96/92 | 78 | 66 | 61 | 63 | 83 |
| 6b | 96/92 | 78 | 67 | 67 | 67 | 90 |

The improved gloss of coatings in accordance with the invention after three, six, none and twelve months exposure compared to prior art coatings is readily apparent. Also, the coatings in accordance with the present invention were more readily cleaned than the prior art coatings.

Other examples and embodiments of the invention will now be apparent to a person skilled in the art, the scope of the invention being defined in the appended claims.

What we claim as new and desire to protect by Letters Patent of the United States is:

1. A saturated linear polyester resin composition suitable for coating a metal for anti-corrosion and/or decorative purposes, comprising:
a polyol, a dibasic acid and from about 4 to about 12% by weight solids of a $C_{16}$ to $C_{18}$ carbon chain oil function in the form of a fatty acid or derivative thereof.

2. A polyester resin composition according to claim 1 wherein the polyol comprises propylene glycol.

3. A polyester resin composition according to claim 1 wherein the dibasic acid comprises at least one member of the group consisting of pthalic acid, isopthalic acid and adipic acid.

4. A polyester resin composition according to claim 1 wherein the $C_{16}$ to $C_{18}$ carbon chain oil function comprises at least one member of the group consisting of dehydrated castor fatty acid, coconut fatty acid, tall oil fatty acid, dimer acid and hydrogenated castor oil.

5. A polyester resin composition according to claim 1 wherein the polyol, dibasic acid and oil function are dissolved in an organic solvent to provide a solution containing from about 60 to about 90% by weight solids.

6. A polyester resin composition according to claim 5 wherein the solution contains from about 75 to about 90% by weight solids.

7. A method of providing a metal with a coating for anti-corrosion and/or decorative purposes comprising applying a liquid polymer comprising a polyol, a dibasic acid, and from about 4 to about 12% by weight solids of a $C_{16}$ to $C_{18}$ carbon chain oil function in the form of a fatty acid or derivative thereof, and curing the liquid polymer with a liquid amino resin to cause further polymerization and cross-linking with resultant formation of a solid coating.

8. A method according to claim 7 wherein the polyol comprises propylene glycol.

9. A method according to claim 7 wherein the dibasic acid comprises at least one member of the group consisting of pthalic acid, isopthalic acid and adipic acid.

10. A method according to claim 7 wherein the $C_{16}$ to $C_{18}$ carbon chain oil function comprises at least one member of the group consisting of dehydrated castor fatty acid, coconut fatty acid, tall oil fatty acid, dimer acid, and hydrogenated castor oil.

11. A method according to claim 7 wherein the liquid polymer contains from about 60 to about 90% by weight solids.

12. A method according to claim 11 wherein the polyol, dibasic acid and oil function are dissolved in an organic solvent to provide a solution containing from about 60 to about 90% by weight solids.

13. A coated metal article wherein the coating has been formed by polymerizing and cross-linking a liquid polymer and a liquid amino resin, said liquid polymer being a saturated linear polyester resin composition comprising a polyol, a dibasic acid ahd from about 4 to about 12% by weight solids of a $C_{16}$ to $C_{18}$ carbon chain oil function in the form of a fatty acid or derivative thereof.

14. A coated metal article according to claim 13 wherein the polyol comprises propylene glycol.

15. A coated metal article according to claim 14 wherein the dibasic acid comprises at least one member of the group consisting of pthalic acid, isopthalic acid and adipic acid.

16. A coated metal article according to claim 13 wherein the $C_{16}$ to $C_{18}$ carbon chain oil function comprises at least one member of the group consisting of dehydrated castor fatty acid, coconut fatty acid, tall oil fatty acid, dimer acid, and hydrogenated castor oil.

* * * * *